United States Patent
Sung

(10) Patent No.: US 12,075,303 B2
(45) Date of Patent: *Aug. 27, 2024

(54) WIRELESS USER DEVICE HANDOVERS BASED ON QUALITY-OF-SERVICE

(71) Applicant: T-MOBILE INNOVATIONS LLC, Overland Park, KS (US)

(72) Inventor: Sanghoon Sung, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 125 days.

This patent is subject to a terminal disclaimer.

(21) Appl. No.: 18/050,798

(22) Filed: Oct. 28, 2022

(65) Prior Publication Data

US 2023/0075686 A1    Mar. 9, 2023

Related U.S. Application Data

(63) Continuation of application No. 16/940,184, filed on Jul. 27, 2020, now Pat. No. 11,516,719.

(51) Int. Cl.
*H04W 36/30* (2009.01)
*H04W 24/08* (2009.01)

(52) U.S. Cl.
CPC ........... *H04W 36/30* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 11,019,547 B1* | 5/2021 | Oroskar | H04W 36/00837 |
| 2011/0182271 A1 | 7/2011 | Pica et al. | |
| 2014/0378142 A1 | 12/2014 | Xuan et al. | |
| 2018/0035345 A1 | 2/2018 | Chockalingam et al. | |
| 2019/0281515 A1* | 9/2019 | Wong | H04W 36/0058 |
| 2020/0045590 A1 | 2/2020 | Wu | |
| 2020/0045603 A1 | 2/2020 | Wang et al. | |
| 2020/0059817 A1 | 2/2020 | Baek et al. | |
| 2021/0112472 A1* | 4/2021 | Smith | H04W 36/08 |

FOREIGN PATENT DOCUMENTS

| | | |
|---|---|---|
| WO | 2018057200 A1 | 3/2018 |
| WO | 2019204165 A1 | 10/2019 |
| WO | 2019204166 A1 | 10/2019 |
| WO | 2019246446 A1 | 12/2019 |
| WO | 2020033210 A1 | 2/2020 |

* cited by examiner

*Primary Examiner* — Charles N Appiah
*Assistant Examiner* — Frank E Donado

(57) ABSTRACT

A wireless communication network delivers a wireless data service from a source access node and a target access node. The network determines a source QoS for the wireless data service from the source access node and a target QoS for the wireless data service from the target access node. The network determines a QoS offset based on a QoS difference between the source QoS and the target QoS. To handover a User Equipment (UE), the network receives source signal strength for the source access node and target signal strength for the target access node from the UE. In response, the network selects the target access node for the handover based on the QoS offset and a signal strength difference between the source signal strength and the target signal strength. The network signals the UE and the target access node to handover the UE to the target access node.

20 Claims, 13 Drawing Sheets

WIRELESS USER DEVICE HANDOVERS BASED ON QUALITY-OF-SERVICE

RELATED CASES

This United States Patent Application is a continuation of U.S. patent application Ser. No. 16/940,184 that was filed on Jul. 27, 2020 and is entitled "WIRELESS USER DEVICE HANDOVERS BASED ON QUALITY-OF-SERVICE." U.S. patent application Ser. No. 16/940,184 is hereby incorporated by reference into this United States Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which typically use antenna towers to exchange wireless signals with the wireless user devices using wireless network protocols. Exemplary wireless network protocols include Fifth Generation New Radio (5GNR), Millimeter-Wave (MMW), Long Term Evolution (LTE), Institute of Electrical and Electronic Engineers (IEEE) 802.11 (WIFI), and Low-Power Wide Area Network (LP-WAN). The wireless communication networks deliver the wireless data service using Quality-of-Service (QoS) levels. The QoS levels specify data communication parameters for throughput, latency, error rate, and the like. A live video conference may have guaranteed levels for data throughput and low latency, while an internet-access session may have best effort levels for data throughput, latency, and error rate.

As a wireless user device moves about, the wireless signal from its serving access node weakens and a wireless signal from a target access node strengthens. The wireless user device measures and reports the signal strength of the target access node to the serving access node. The serving access node compares the signal strength difference between the source and target to determine when to handover the wireless user device to the target access node. The serving access node may process other values along with the signal strength values like offsets and hysteresis. An exemplary offset is a frequency offset based on the frequency band used by the target access node. Unfortunately, the serving access nodes do not efficiently and effectively use QoS offsets to control the wireless handovers.

TECHNICAL OVERVIEW

A wireless communication network delivers a wireless data service from a source access node and a target access node. The network determines a source QoS for the wireless data service from the source access node and a target QoS for the wireless data service from the target access node. The network determines a QoS offset based on a QoS difference between the source QoS and the target QoS. To handover a User Equipment (UE), the network receives source signal strength for the source access node and target signal strength for the target access node from the UE. In response, the network selects the target access node for the handover based on the QoS offset and a signal strength difference between the source signal strength and the target signal strength. The network signals the UE and the target access node to handover the UE to the target access node.

DETAILED DESCRIPTION

Figure 1:
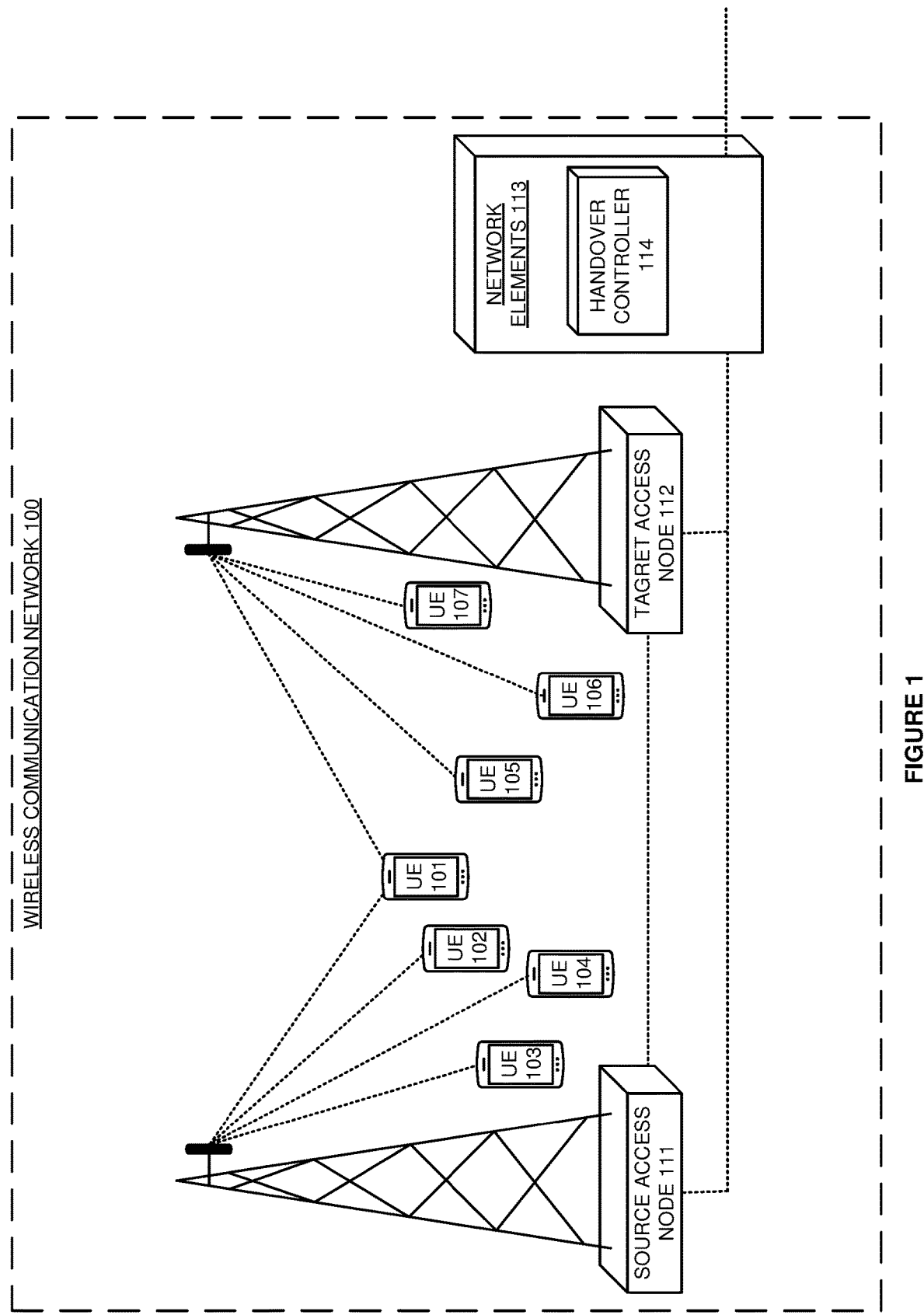
FIG. 1 illustrates a wireless communication network to handover wireless User Equipment (UE) based on Quality-of-Service (QoS).

FIG. 1 illustrates wireless communication network 100 to handover wireless User Equipment (UE) 101 based on Quality-of-Service (QoS). Wireless communication network 100 delivers wireless data services like internet-access, video-calling, media-streaming, augmented-reality, machine-control, and/or some other wireless networking product. Wireless communication network 100 comprises wireless UEs 101-107, source access node 111, target access node 112, and network elements 113. Network elements 113 include handover controller 114.

Various examples of network operation and configuration are described herein. In some examples, access nodes 111-112 wirelessly deliver wireless data services to User Equipment (UEs) 101-107. The wireless data services have QoS Flow Indicators (QFIs). Access nodes 111-112 determine performance metrics for the QFIs like packet loss, scheduling delay, radio resource usage, data rate, Channel Quality Index (CQI), and/or some other performance measurement. Access nodes 111-112 transfer the performance metrics for the QFIs to handover controller 114. Handover controller 114 compares the performance metrics from access nodes 111-112 on a per-QFI basis to determine individual QFI offsets for the individual QFIs for the specific handovers from source access node 111 to target access node 112. Advantageously, the individual QFI offsets effectively and efficiently control handovers from source access node 111 to target access node 112 based on their specific comparative QoS. Handover controller 114 transfers the QFI offsets to source access node 111. Source access node 111 wirelessly serves UE 101 with wireless data services that use the QFIs. UE 101 measures the signal strength of a pilot signal from target access node 112. UE 101 transfers the signal strength of target access node 112 to source access node 111. Source access node 111 selects a QFI offset that corresponds to the QFIs used by UE 101. Source access node 111 applies the selected QFI offset to the target signal strength to determine whether to perform or reject the handover to target access node 112. Source access node 111 efficiently and effectively uses special QFI offsets to control wireless handovers.

In some examples, handover controller 114 exerts live handover control. After detecting the handover event, target access node 111 transfers signaling to handover controller 114 that indicates target access node 112, the current QFIs for UE 101, and performance metrics for the QFIs. Handover controller 114 compares the live performance metrics from source access node 111 to the previously received performance metrics from target access node 112 for the indicated QFIs to determine a QFI offset. Handover controller 114 returns the QFI offset to source access node 111. Source access node 111 applies the received QFI offset to the target signal strength to determine whether to perform or reject the handover to target access node 112.

In some examples, handover controller 114 processes the performance metrics to identify lower-than-average metrics like the metrics at the bottom $10^{th}$ percentile. Handover controller 114 may compare these representative metrics to better compare difficult network scenarios. Handover controller 114 determines the QFI offsets based on comparisons of these "difficult" representative metrics. In some examples, handover controller 114 processes the performance metrics to identify moving averages of the metrics. Handover controller 114 compares the moving averages to determine (and update) the individual QFI offsets. Thus, handover controller 114 may compare moving averages of performance metrics at the $10^{th}$ percentile one a per-QFI basis to determine the individual QFI offsets.

UEs 101-107 wirelessly communicate with access nodes 111-112 over wireless links. The wireless links use Radio Access Technologies (RATs) like Long Term Evolution (LTE), Fifth Generation New Radio (5GNR), Millimeter-Wave (MMW), Institute of Electrical and Electronic Engineers (IEEE) 802.11 (WIFI), Low-Power Wide Area Network (LP-WAN), and/or some other protocol. The handovers may be intra-RAT or inter-RAT. The wireless links use electromagnetic frequencies in the low-band, mid-band, high-band, or some other portion of the electromagnetic spectrum. Access nodes 111-112 communicate with each other and with network elements 113 over data links. Network elements 113 communicate with external systems like the internet over data links. The data links use metal, glass, air, or some other media. The data links use IEEE 802.3 (Ethernet), Time Division Multiplex (TDM), Data Over Cable System Interface Specification (DOCSIS), Internet Protocol (IP), 5GC, 5GNR, LTE, WIFI, virtual switching, inter-processor communication, bus interfaces, and/or some other data communication protocols.

Although UE 101 is depicted as a smartphone, UE 101 might instead comprise a computer, robot, vehicle, or some other data appliance with wireless communication circuitry. Access nodes 111-112 are depicted as towers, but access nodes 111-112 may use other mounting structures or no mounting structure at all. Access nodes 111-112 may comprise gNodeBs, eNodeBs, hot-spots, base-stations, and/or some other form of wireless network transceiver. Network elements 113 comprise Access and Mobility Management Functions (AMFs), User Plane Functions (UPFs), Mobility Management Entities (MMEs), Gateways (GWs), Internet-of-Things (IoT) application servers, content-delivery servers, and/or some other form of wireless network apparatus. In some examples, network elements 113 (including handover controller 114) comprise Virtual Network Functions (VNFs) in a Network Function Virtualization Infrastructure (NFVI).

UEs 101-107 and access nodes 111-112 each comprise antennas, amplifiers, filters, modulation, analog/digital interfaces, microprocessors, software, memories, transceivers, bus circuitry, and the like. Network elements 113 and handover controller 114 comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein.

Figure 2:
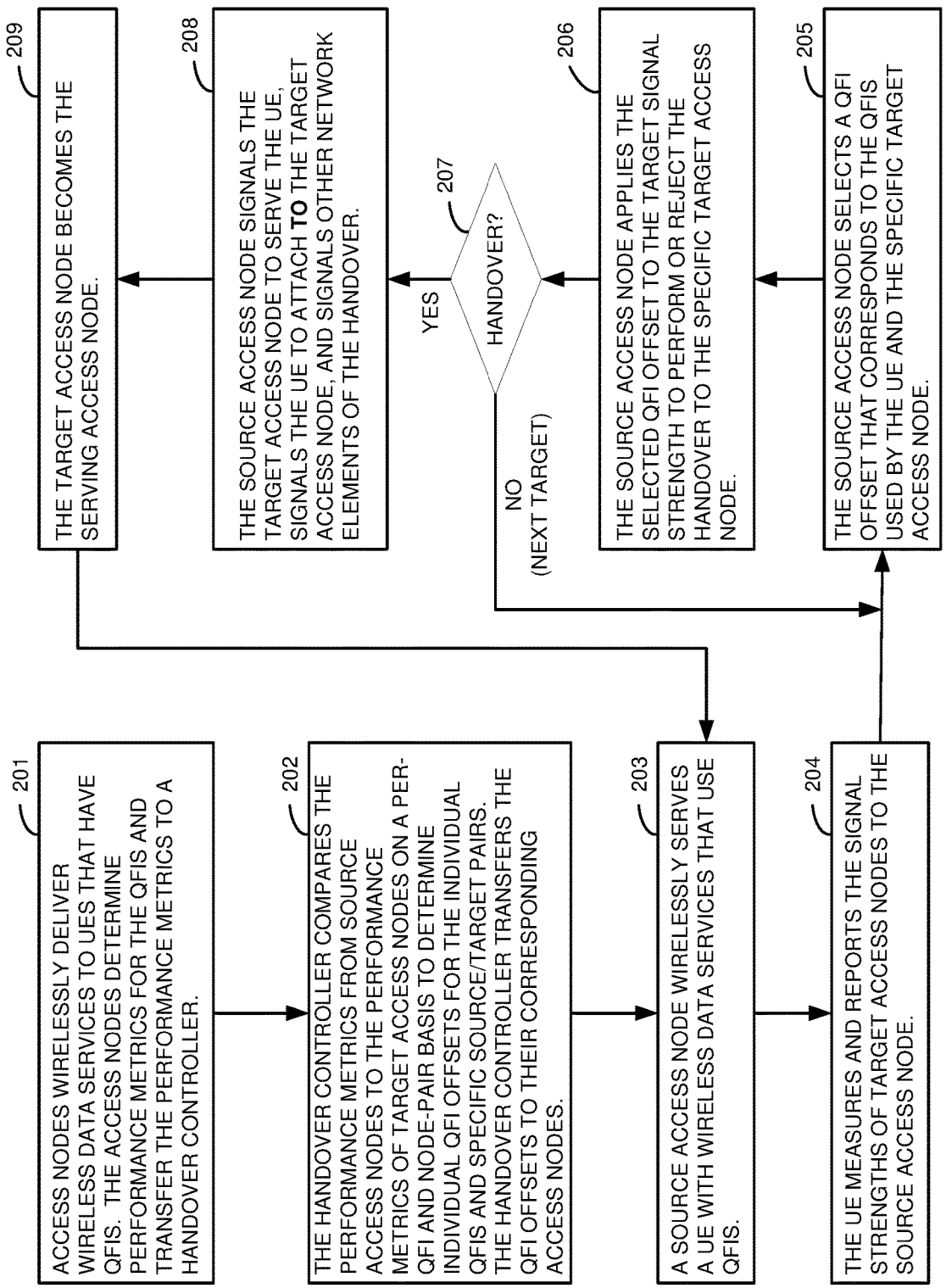
FIG. 2 illustrates an exemplary operation of the wireless communication network to handover the wireless UE based on QoS.

FIG. 2 illustrates an exemplary operation of wireless communication network 100 to handover a wireless UE 101 based on QoS. The access nodes wirelessly deliver wireless data services to the UEs that have QFIs (201). The access nodes determine performance metrics for the QFIs and transfer the performance metrics to a handover controller (201). The handover controller compares the performance metrics from the source access nodes to the performance metrics from target access nodes on a per-QFI basis for the individual source/target pairs to determine individual QFI offsets for the individual QFIs (and common QFI combinations) and specific source/target pairs (202). The handover controller transfers the QFI offsets to their corresponding source access nodes (202). A source access node wirelessly serves the UE with wireless data services that use a set of the QFIs (203). A UE measures and reports the signal strength for the target access nodes to the source access node (204). The source access node selects a QFI offset that corresponds to the QFIs used by the UE and to the specific target access node (205). The source access node applies the selected QFI offset to the target signal strength to perform or reject the handover to the specific target access node (206). When the source access node rejects the handover (207), the source access node restarts the operation for the next best target access node based on the report from the UE (206). The source access node performs the handover by signaling the target access node to serve the UE, signaling the UE to attach to the target access node, and signaling network elements of the handover (208). After the handover, the target access node becomes the serving access node (209) and wirelessly serves the UE 101 with the wireless data services that use QFIs (203). Operations 201-202 are periodically repeated.

Figure 3:
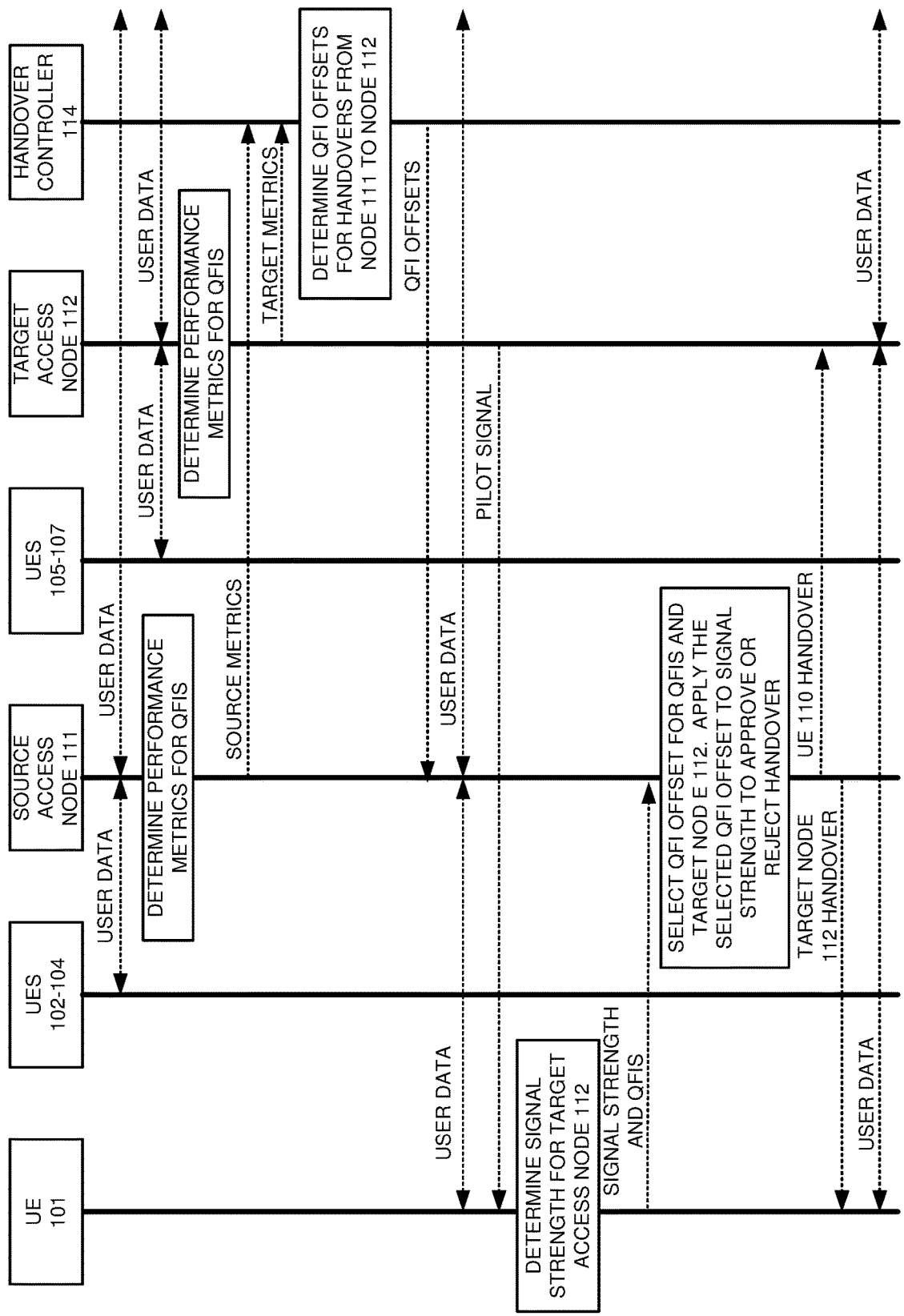
FIG. 3 illustrates an exemplary operation of the wireless communication network to handover the wireless UE based on QoS.

FIG. 3 illustrates an exemplary operation of wireless communication network 100 to handover wireless UE 101 based on QoS. Source access node 111 wirelessly exchange user data with UEs 102-104 to deliver wireless data services that have QFIs. Source access node 111 determines source performance metrics for the QFIs like packet loss and data rate. Source access node 111 transfers the source performance metrics for the QFIs to handover controller 114. Target access node 112 wirelessly exchange user data with UEs 105-107 to deliver the wireless data services that have the QFIs. Target access node 112 determines target performance metrics for the QFIs. Target access node 112 transfers the target performance metrics for the QFIs to handover controller 114. Handover controller 114 compares the performance metrics from access nodes 111-112 on a per-QFI and node-pair basis to determine individual QFI offsets for handovers from source access node 111 to target access node 112. Handover controller 114 transfers the QFI offsets for the QFIs to source access node 111. Source access node 111 wirelessly exchange user data with UE 101 to deliver one of the wireless data services that has one of the QFIs. UE 101 measures the signal strength for target access node 112 and transfers the signal strength to source access node 111. Source access node 111 selects one or more QFI offsets that corresponds to the one or more QFIs used by UE 101. Source access node 111 applies the selected QFI offset(s) to the target signal strength to determine whether to perform or reject the handover to target access node 112. In this example, source access node 111 performs the handover by signaling target access node 112 to serve UE 101 and signaling UE 101 to attach to target access node 112. After the handover, target access node 112 is now the source access node and wirelessly exchanges user data with UE 101 to deliver the wireless data service that has the QFI(s).

Figure 4:
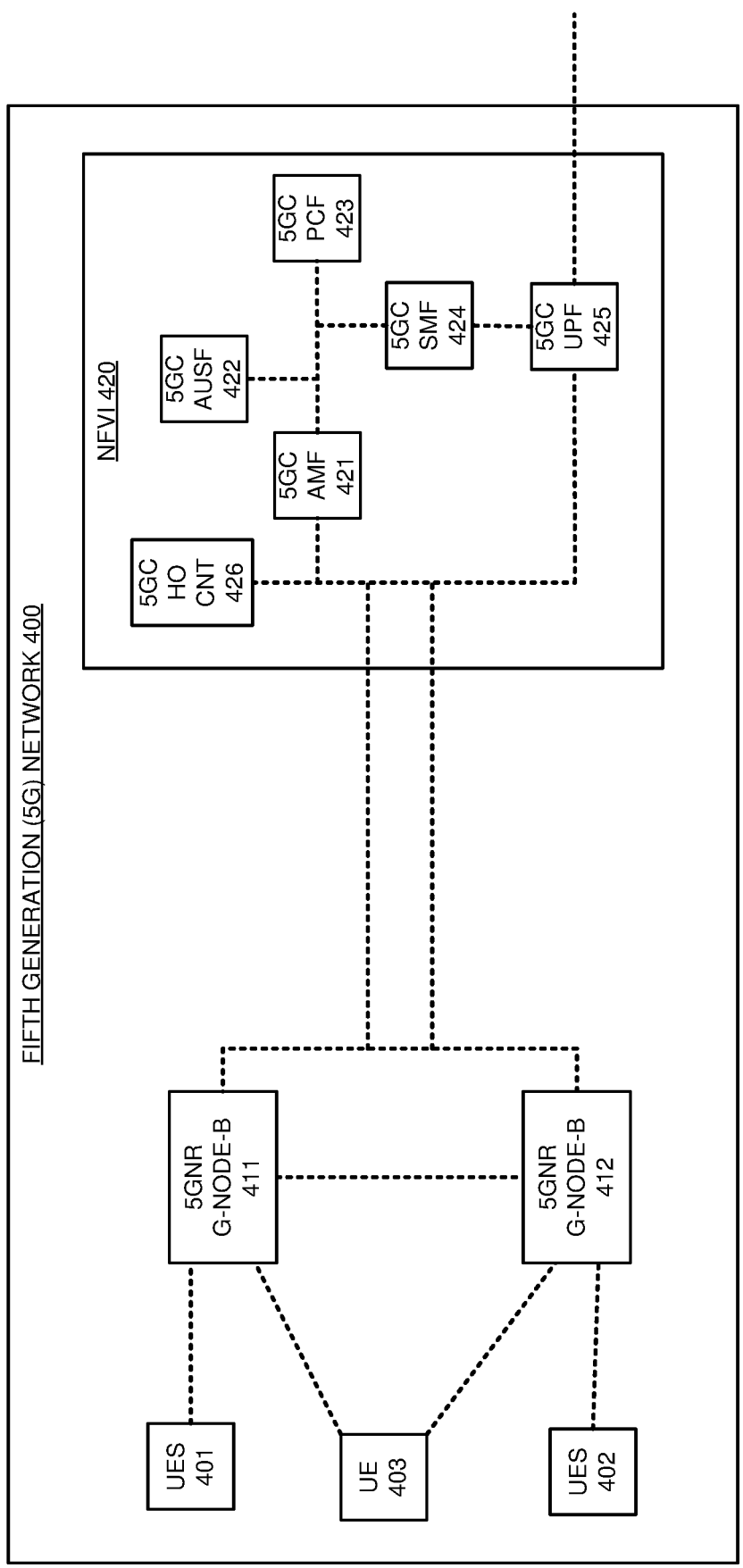
FIG. 4 illustrates a Fifth Generation (5G) wireless communication network to handover a wireless UE based on QoS.

FIG. 4 illustrates Fifth Generation (5G) wireless communication network 400 to handover a wireless UE based on QoS. 5G wireless communication network 400 comprises an example of wireless communication network 100, although network 100 may differ. 5G wireless communication network 400 comprises UEs 401-403, 5GNR gNodeBs 411-412, and Network Function Virtualization Infrastructure (NFVI) 420. NFVI 420 comprises Fifth Generation Core (5GC) Access and Mobility Management Function (AMF) 421, 5GC Authentication and Security Function (AUSF) 422, 5GC Policy Control Function (PCF) 423, 5GC Session Management Function (SMF) 424, 5GC User Plane Function (UPF) 425, and 5GC handover controller (HO CNT) 426. 5GNR gNodeBs 411-412 wirelessly deliver wireless data services that have QFIs to UEs 401-403.

5GNR gNodeBs 411-412 determine performance metrics for the QFIs like packet loss, scheduling delay, radio block usage, data rate, CQI, and/or some other performance measurement. Packet loss comprises the ratio of the amount of successfully transmitted packets to the amount of unsuccessfully transmitted packets. The unsuccessfully transmitted packets may not arrive or may arrive in a garbled state. Sometimes the packet loss ratio uses factors like total packets instead of successfully transmitted packets and/or both lost and successfully retransmitted packets instead of just lost packets. The scheduling delay comprises the amount of time between receiving user data and scheduling the resource blocks to transport the data since timely resource blocks may not always be available to schedule. The resource block usage comprises the average amount of resource blocks that are allocated per time slot for the specific QFI. The resource block usage indicates whether a specific QFI has been served over a wider band or a narrower band. The data rate is typically measured in bits per second. The CQI indicates the average radio quality at the UE and uses factors like signal strength and noise. The UEs measure and report their CQIs to their serving gNodeBs.

5GNR gNodeBs 411-412 transfer the performance metrics for the QFIs to 5GC handover controller 426. 5GC handover controller 426 compares the performance metrics from 5GNR gNodeBs 411-412 on a per-QFI basis to determine individual QFI offsets for the individual QFIs. The individual QFI offsets control handovers to/from 5GNR gNodeBs 411-412 based on comparative QoS. 5GC handover controller 426 transfers the QFI offsets to 5GNR gNodeBs 411-412.

5GNR gNodeB 411 wirelessly serves UE 403 with wireless data services that use a subset of the QFIs. UE 403 measures the signal strength of a pilot signal from 5GNR gNodeB 412. UE 403 transfers the signal strength of 5GNR gNodeBs 412 to 5GNR gNodeB 411. 5GNR gNodeB 411 selects a QFI offset that corresponds to the set of QFIs used by UE 403. 5GNR gNodeB 411 hosts a data structure that correlates individual QFIs and some combinations of QFIs with their specific QFI offset. 5GNR gNodeB 411 applies the selected QFI offset to the signal strength of 5GNR gNodeB 412 to determine whether to perform or reject the handover to 5GNR gNodeB 412. The application of the QFI offset entails summing the signal strength, offsets, and hysteresis values to get a value and then comparing the value to a handover threshold like the "A" and "B" thresholds for 5GNR handovers. 5GNR gNodeB 411 initiates the handover when the value for 5GNR gNodeB 411 exceeds the handover threshold. To initiate the handover, 5GNR gNodeB 411 transfers signaling to UE 403, gNodeB 412, and 5GC AMF 421. After the handover, 5GNR gNodeB 412 wirelessly serves UE 403 with the wireless data services that use the subset of QFIs.

Figure 5:
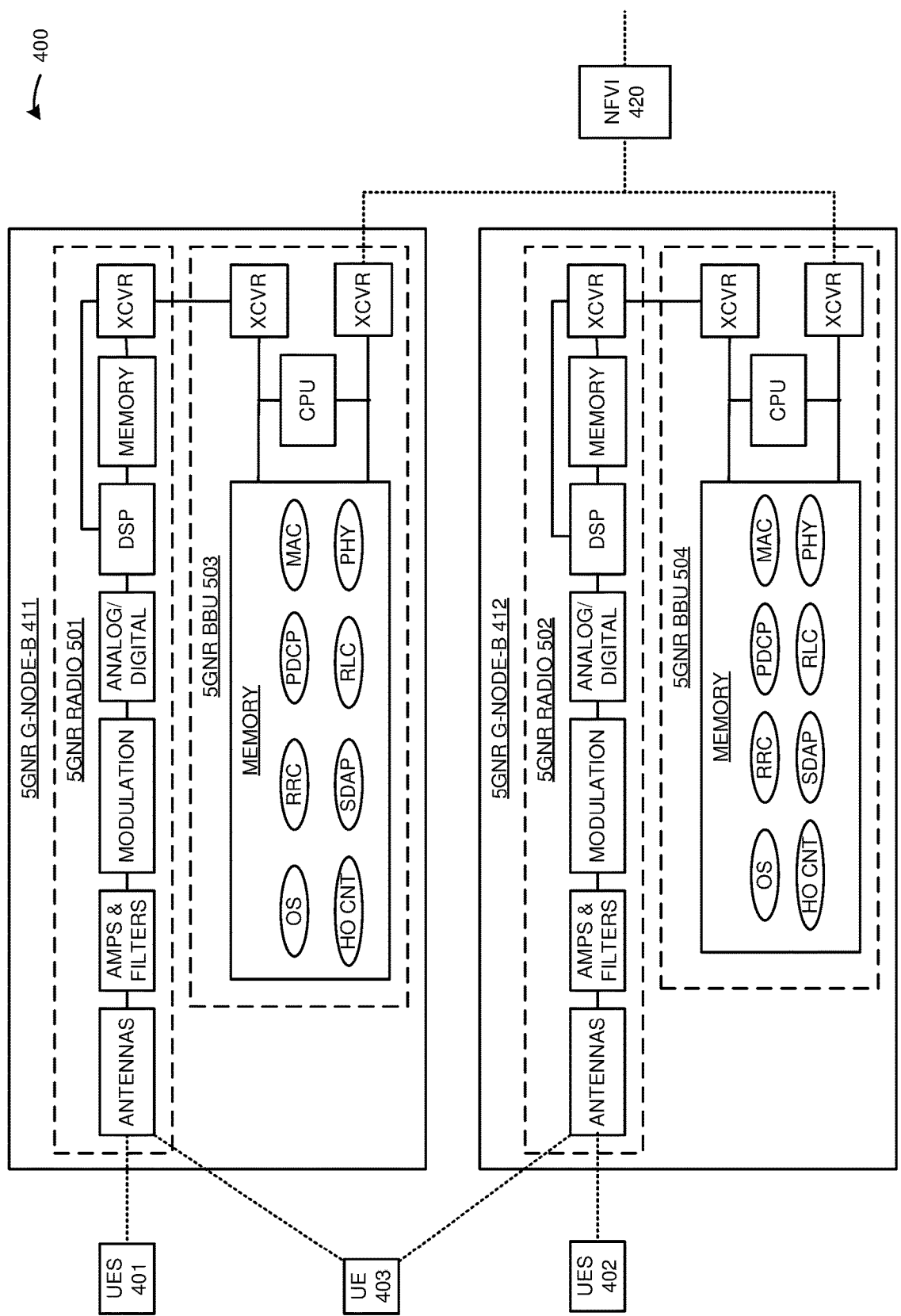
FIG. 5 illustrates a 5G New Radio (NR) gNodeB to handover the wireless UE based on QoS.

FIG. 5 illustrates 5G New Radio (NR) gNodeB s 411-412 to handover wireless UE 403 based on QoS. 5GNR gNodeBs 411-412 comprise an example of wireless access nodes 111-112, although access nodes 111-112 may differ. 5GNR gNodeB 411 comprises 5GNR radio 501 and 5GNR BBU 503. 5GNR gNodeB 412 comprises 5GNR radio 502 and 5GNR BBU 504. Radios 501-502 comprise antennas, amplifiers, filters, modulation, analog-to-digital interfaces, DSP, memory, and transceivers that are coupled over bus circuitry. BBUs 503-504 comprise memory, CPU, and transceivers that are coupled over bus circuitry. The memories in BBUs 503-504 store operating systems and network applications like Physical Layer (PHY), Media Access Control (MAC), Radio Link Control (RLC), Packet Data Convergence Protocol (PDCP), Radio resource Control (RRC), Service Data Adaptation Protocol (SDAP), Handover Controller (HO CNT). The CPU in BBUs 503-504 execute the operating systems, PHYs, MACs, RLCs, PDCPs, SDAPs, RRCs, and handover controllers to exchange signaling and user data with UE 403 and to exchange signaling and user data with NFVI 420. UEs 401 and 403 are wirelessly coupled to the antennas in 5GNR radio 501 over 5GNR links. UEs 402-403 are wirelessly coupled to the antennas in 5GNR radio 502 over 5GNR links. A transceiver in 5GNR radio 501 is coupled to a transceiver in 5GNR BBU 503 over CPRI links. A transceiver in 5GNR radio 502 is coupled to a transceiver in 5GNR BBU 504 over CPRI links. Transceivers in 5GNR BBUs 503-504 are coupled to NFVI 420 over backhaul links.

In 5GNR radios 501-502, the antennas receive wireless 5GNR signals from UEs 401-403 that transport UL 5GNR signaling and UL 5GNR data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSPs. The DSPs recover UL 5GNR symbols from the UL digital signals. The CPUs execute the network applications to process the UL 5GNR symbols and recover the UL 5GNR signaling and the UL 5GNR data. The 5GNR RRCs processes the UL 5GNR signaling and DL 5GC N2 signaling from NFVI 420 to generate new UL 5GC N2 signaling and new DL 5GNR signaling. The 5GNR RRCs transfer the new UL 5GC N2 signaling to AMF 421. The 5GNR SDAP transfers corresponding UL 5GC N3 data to NFVI 420.

In 5GNR BBUs 503-504, the 5GNR RRCs receive the 5GC DL N2 signaling from NFVI 420. The 5GNR SDAPs receive DL 5GNR N3 data from UPF NFVI 420. The 5GNR network applications process the new DL 5GNR signaling and the DL 5GNR data to generate corresponding DL 5GNR symbols that carry the DL 5GNR signaling and DL 5GNR data. In 5GNR radios 501-502, the DSPs processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals to UEs 401-403 that transport the DL 5GNR signaling and DL 5GNR data.

RRC functions comprise authentication, security, handover control, status reporting, Quality-of-Service (QoS), network broadcasts and pages, and network selection. SDAP functions include packet marking and QoS enforcement. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

5GNR gNodeBs 411-412 wirelessly deliver wireless data services that have QFIs to UEs 401-402. 5GNR BBUs 503-504 determine performance metrics for the QFIs like packet loss, scheduling delay, radio block usage, data rate, CQI, and/or some other performance measurement. 5GNR BBUs 503-504 transfer the performance metrics for the QFIs to 5GC handover controller 426. 5GC handover controller 426 transfers individual QFI offsets for individual QFIs and for common QFI combinations. 5GNR BBUs 503-504 receive the QFI offsets from handover controller 426.

Initially, 5GNR gNodeB 411 wirelessly serves UE 403 with wireless data services that use a subset of the QFIs. UE 403 measures the signal strength of a pilot signal from 5GNR gNodeB 412 and transfers the signal strength to 5GNR gNodeB 411. 5GNR BBU 503 selects a QFI offset that corresponds to the set of QFIs used by UE 403 and a handover to target 5GNR gNodeB 412. 5GNR BBU 403 applies the selected QFI offset to the signal strength of 5GNR gNodeB 412 to determine whether to perform or reject the handover to 5GNR gNodeB 412. After the handover if any, 5GNR gNodeB 412 wirelessly serves UE 403 with the wireless data services that use the subset of the QFIs.

Figure 6:
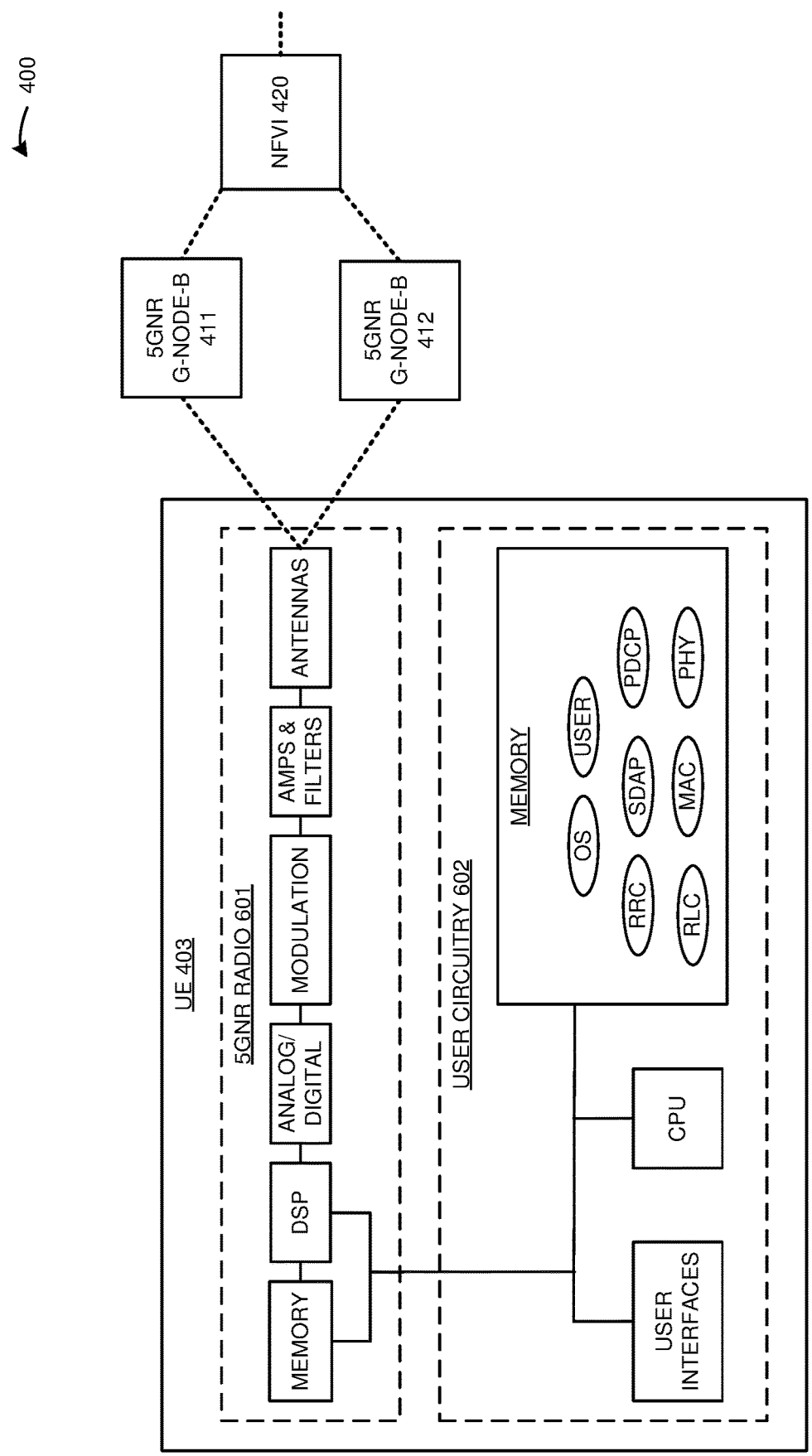
FIG. 6 illustrates the wireless UE that is handed over based on QoS.

FIG. 6 illustrates wireless UE 403 that is handed over based on QoS. UE 403 comprises 5GNR radio 601 and user circuitry 602 that are coupled over bus circuitry. Radio 601 comprises antennas, amplifiers, filters, modulation, analog-to-digital interfaces, DSP, and memory that are coupled over bus circuitry. User circuitry 602 comprises user interfaces, CPU, and memory that are coupled over bus circuitry. UE 403 is an example of UEs 101-107, although UEs 101-107 may differ.

The antennas in radio 601 are wirelessly coupled to 5GNR gNodeBs 411-412. The user interfaces in user circuitry 602 comprise graphic displays, machine controllers, sensors, cameras, transceivers, and/or some other user components. The memory in user circuitry 602 store an operating system, user applications (USER), and network applications (PHY, MAC, RLC, PDCP, SDAP, and RRC). The CPU in user circuitry 602 executes the operating system and the user applications to generate and consume user data. The CPU in user circuitry 602 executes the operating system and the network applications to wirelessly exchange corresponding network signaling and user data with 5GNR gNodeBs 411-412 over radio 601.

In 5GNR radio 601, the antennas receive wireless signals from gNodeBs 411-412 that transport DL network signaling and DL user data. The antennas transfer corresponding electrical DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSPs. The DSPs recovers DL symbols from the DL digital signals. The CPUs execute the network applications to process the DL symbols and recover the DL network signaling and the DL user data. The RRCs process the DL network signaling and user signaling from the operating system to generate new UL network signaling and new DL user signaling. The network applications process the new UL network signaling and the UL user data to generate corresponding UL symbols that carry the UL network signaling and UL user data. In radio 601, the DSP processes the UL symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless signals to 5GNR gNodeBs 411-412 that transport the UL network signaling and UL user data.

RRC functions comprise authentication, security, handover control, status reporting, QoS, network broadcasts and pages, and network selection. SDAP functions include packet marking and QoS enforcement. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

In UE 403, user circuitry 602 determines signal strength values for target access nodes QFI and transfers the signal strength data to 5GNR gNodeB 411 over radio 601. User circuitry 602 receives a handover instruction for gNodeB 412 from gNodeB 411 over radio 601. In response, user circuitry 602 attaches to gNodeB 412 and detaches from gNodeB 411. After the handover, UE 403 receives the wireless data services from 5GNR gNodeB 412 using the subset of the QFIs.

Figure 7:
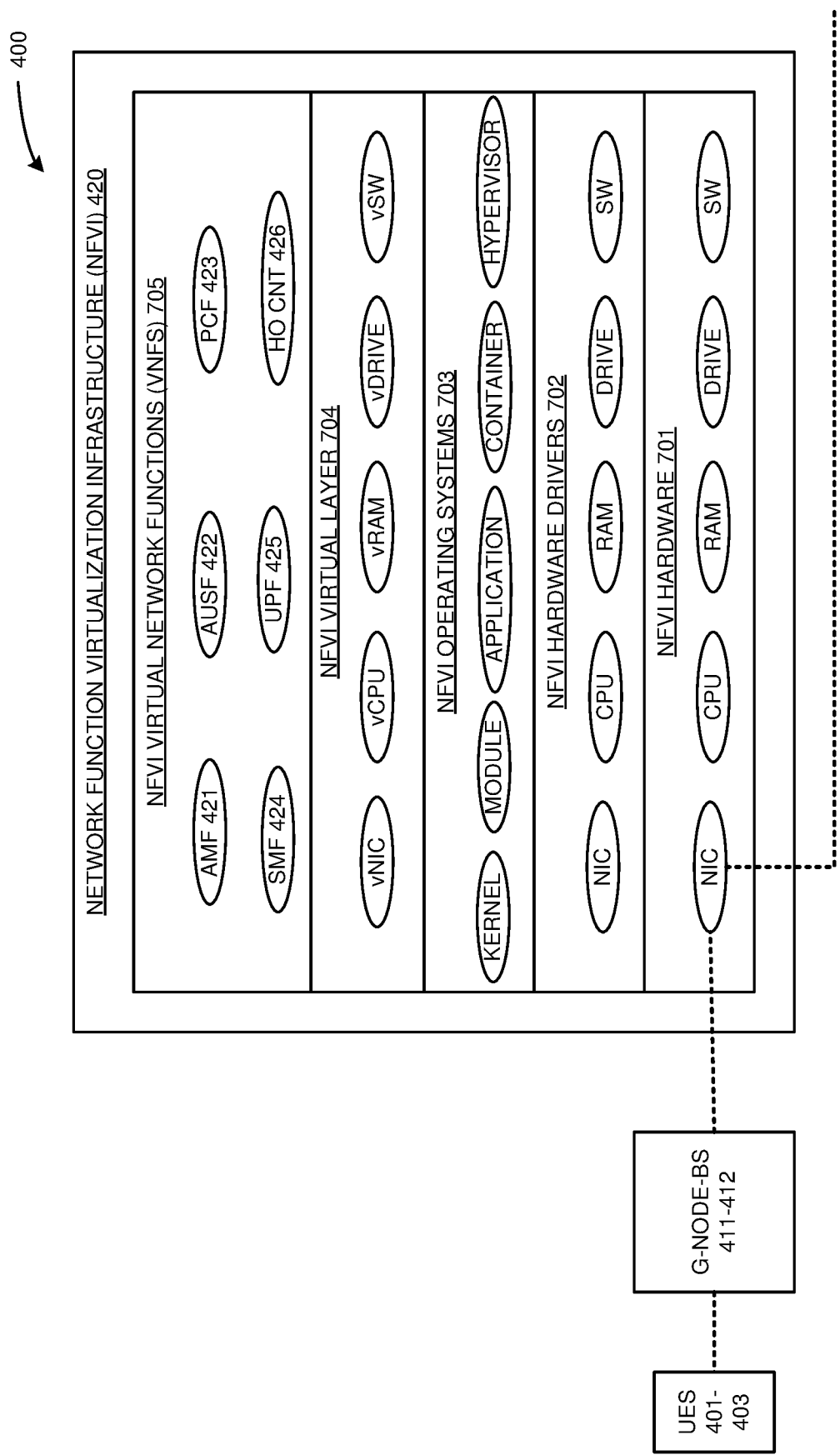
FIG. 7 illustrates a Network Function Virtualization Infrastructure (NFVI) having a handover controller to control the handover the wireless UE based on QoS.

FIG. 7 illustrates Network Function Virtualization Infrastructure (NFVI) 420 having handover controller 426 to control the handover of wireless UE 403 based on QoS. NFVI 420 comprises NFVI hardware 701, NFVI hardware drivers 702, NFVI operating systems 703, NFVI virtual layer 704, and NFVI Virtual Network Functions (VNFs) 705. NFVI hardware 701 comprises Network Interface Cards (NIC), CPU, RAM, flash/disk drives, and data switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises virtual NICs (vNIC), virtual CPUs (vCPU), virtual RAM (vRAM), virtual Drives (vDRIVE), and virtual Switches (vSW). NFVI VNFs 705 comprise AMF 421, AUSF 422, PCF 423, SMF 424, UPF 425, handover controller 426. Other VNFs are typically present but are omitted for clarity. The NIC are coupled to 5GNR gNodeBs 411-412 and to external systems. NFVI hardware 701 executes NFVI hardware drivers 702, NFVI operating systems 703, NFVI virtual layer 704, and NFVI VNFs 705 to serve UEs 401-403 over 5GNR gNodeBs 411-412.

5GC handover controller 426 receives performance metrics for QFIs from 5GNR gNodeBs 411-412. 5GC handover controller 426 compares the performance metrics from 5GNR gNodeBs 411-412 on a per-QFI basis to determine individual QFI offsets for the individual QFIs and gNodeB pairs. The individual QFI offsets control handovers to/from 5GNR gNodeBs 411-412 based on comparative QoS. 5GC handover controller 426 transfers the QFI offsets to 5GNR gNodeBs 411-412.

Figure 8:
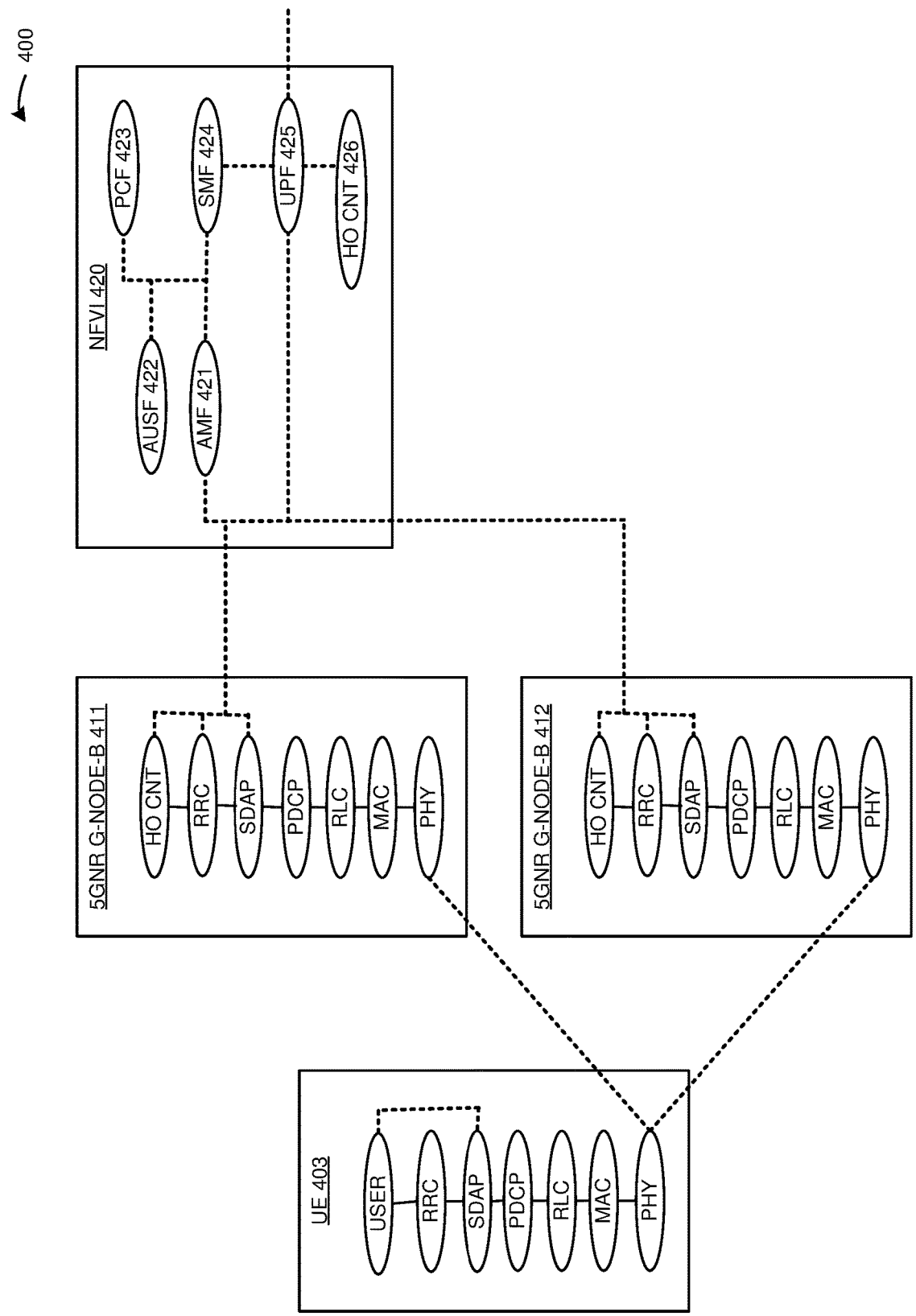
FIG. 8 illustrates an exemplary operation of the 5G wireless communication network to handover the wireless UE based on QoS.

FIG. 8 illustrates an exemplary operation of 5G wireless communication network 400 to handover wireless UE 403 based on QoS. The PHYs and RRCs in 5GNR gNodeBs 411-412 determine performance metrics for individual QFIs like packet loss, scheduling delay, radio block usage, data rate, CQI, and/or some other performance measurements. The RRCs transfer their per-QFI performance metrics their local handover controller applications. The handover controller applications may perform some performance measurements as well. The handover controller applications transfer their per-QFI performance metrics to 5GC handover controller 426 over the SDAP and UPF 425. 5GC handover controller 426 compares the performance metrics from 5GNR gNodeBs 411-412 on a per-QFI basis to determine individual QFI offsets for handovers from gNodeB 411 to gNodeB 412 and from gNodeB 412 to gNodeB 411. 5GC handover controller 426 transfers the QFI offsets to the handover controller applications in 5GNR gNodeBs 411-412. The handover controller applications transfer the QFI offsets to their RRCs.

Initially, the RRC in UE 403 attaches to the RRC in 5GNR gNodeB 411 over the PDCPs, RLCs, MACs, and PHYs. The RRC in 5GNR gNodeB 411 transfer N2 signaling for UE 403 to AMF 421. AMF 421 interacts with AUSF 422 and the RRC in UE 403 (over the RRC in gNodeB 411) to authenticate and authorize UE 403 for wireless data services. AMF 421 interacts with PCF 423 and SMF 424 to select QFIs for the wireless data services. For example, UE 403 could be an aerial drone that gets authorized for a navigation service having a QFI and a video uplink service having another QFI. AMF 421 signals the QFIs and network addresses for the wireless data services for UE 403 to the RRC in 5GNR gNodeB 411. The RRC in 5GNR gNodeB 411 signals the QFIs and network addresses for the wireless data services for UE 403 to the RRC in UE 403.

The PHY in UE 403 measures the signal strength of a pilot signal from 5GNR gNodeB 412 and indicates the signal strength to the RRC. The RRC in UE 403 reports the signal strength for 5GNR gNodeB 412 to the RRC 5GNR gNodeB 411. The RRC in gNodeB 411 selects a QFI offset for the QFIs for UE 403. For example, the RRC may select a 4 decibel QFI offset for a combination of a navigation QFI and a video uplink QFI. In another example, the RRC may select a −3 decibel QFI offset for a combination of an internet-access QFI and a voice calling QFI. The RRC may select other offsets and a hysteresis value. The RRC determines a handover value based on the signal strength, the QFI offset, any other offsets, and any hysteresis. The RRC compares the handover value to a handover threshold like the "A" and "B" thresholds for 5GNR handovers. The RRC initiates the handover when the value exceeds the handover threshold.

To perform the handover, the RRC in 5GNR gNodeB 411 signals the RRC in UE 403 to attach to 5GNR gNodeB 412 and detach from 5GNR gNodeB 412. The RRC in 5GNR gNodeB 411 signals AMF 421 to support UE 403 over 5GNR gNodeB 412. AMF 421 signals SMF 424 to support UE 403 over 5GNR gNodeB 412, and SMF 424 signals UPF 425 to serve UE 403 over 5GNR gNodeB 412. The RRC in UE 403 attaches to the RRC in 5GNR gNodeB 412 over the PDCPs, RLCs, MACs, and PHYs. The RRC in UE 403 detaches from the RRC in 5GNR gNodeB 411. The SDAP in UE 403 exchanges user data with the user applications. The SDAP in UE 403 exchanges the user data with the SDAP in 5GNR gNodeB 412 over the PDCPs, RLCs, MACs, and PHYs. The SDAP in 5GNR gNodeB 412 exchanges the user data with UPF 425 which exchanges the user data with external data systems.

Figure 9:
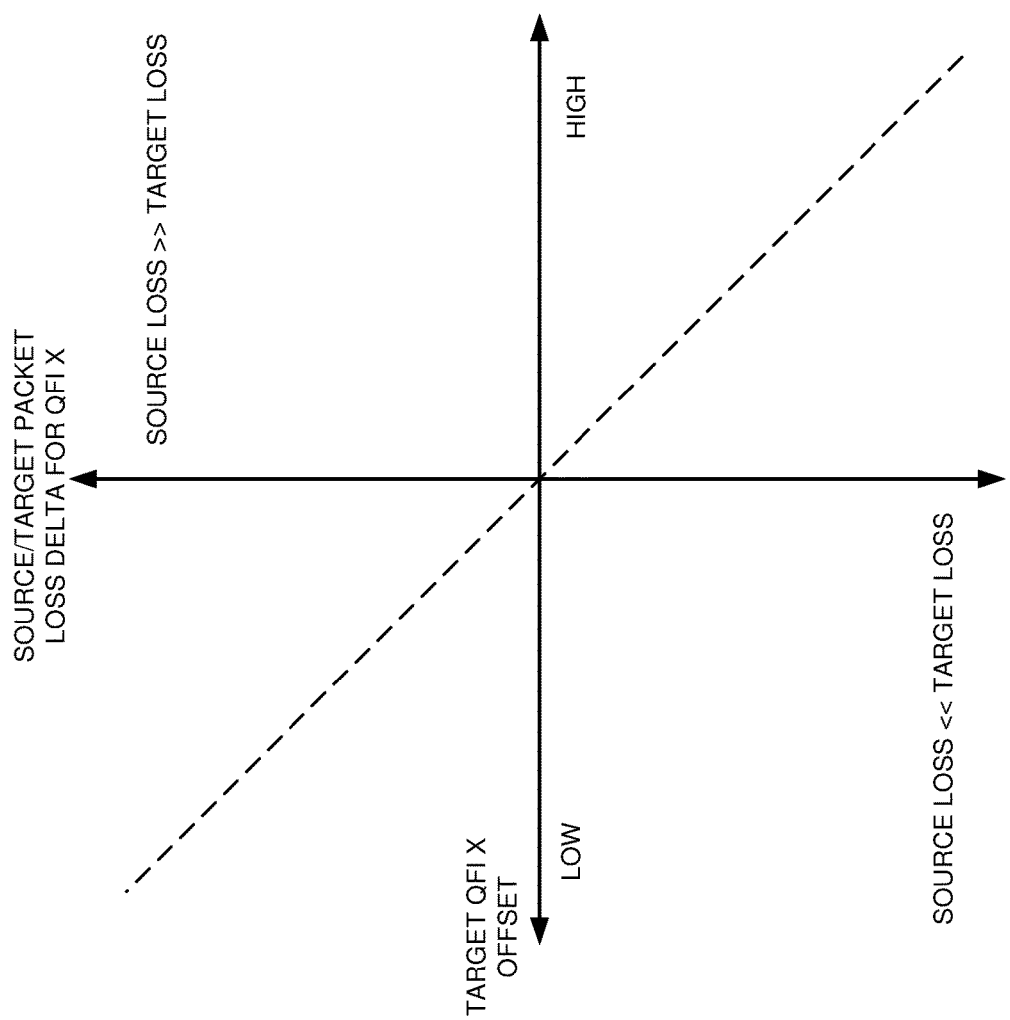
FIG. 9 illustrates the operation of the handover controller to generate a QoS Flow Identifier (QFI) offset based on packet loss.

FIG. 9 illustrates the operation of handover controller 426 to generate a QoS Flow Identifier (QFI) based on packet loss. Handover controller 426 hosts a data structure that incorporates the graph of FIG. 9. The horizontal axis of the graph represents a target QFI offset from a low value on the left to high value on the right. A low QFI offset might be one decibel, and a high QFI offset might be five decibels, although other values could be used. The vertical axis represents the difference (delta) between packet loss for the source and target for QFI X which could be a QFI combination. As indicated by the dashed line, the QFI offset is relatively low when the source loses more packets than the target. The QFI offset is relatively high when the source loses less packets than the target.

Figure 10:
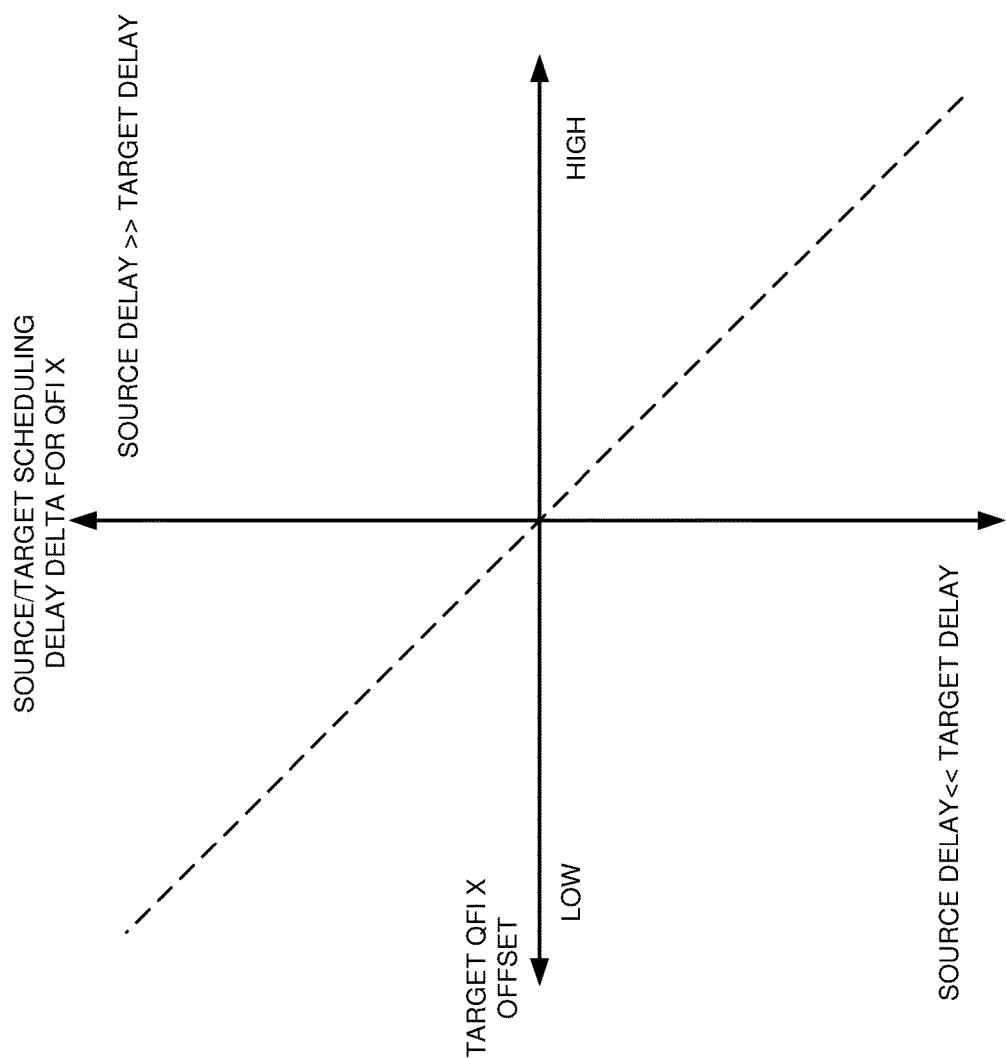
FIG. 10 illustrates the operation of the handover controller to generate the QFI offset based on scheduling delay.

FIG. 10 illustrates the operation of the handover controller to generate the QFI offset based on scheduling delay. Handover controller 426 hosts a data structure that incorporates the graph of FIG. 10. The horizontal axis of the graph represents a target QFI offset from low on the left to high on the right. A low QFI offset might be one decibel, and a high QFI offset might be five decibels, although other values could be used. The vertical axis represents the delta between scheduling delay for the source and target. As indicated by the dashed line, the QFI offset is relatively low when the source scheduling delay is longer than the target scheduling delay. The QFI offset is relatively high when the source scheduling delay is shorter than the target scheduling delay.

Figure 11:
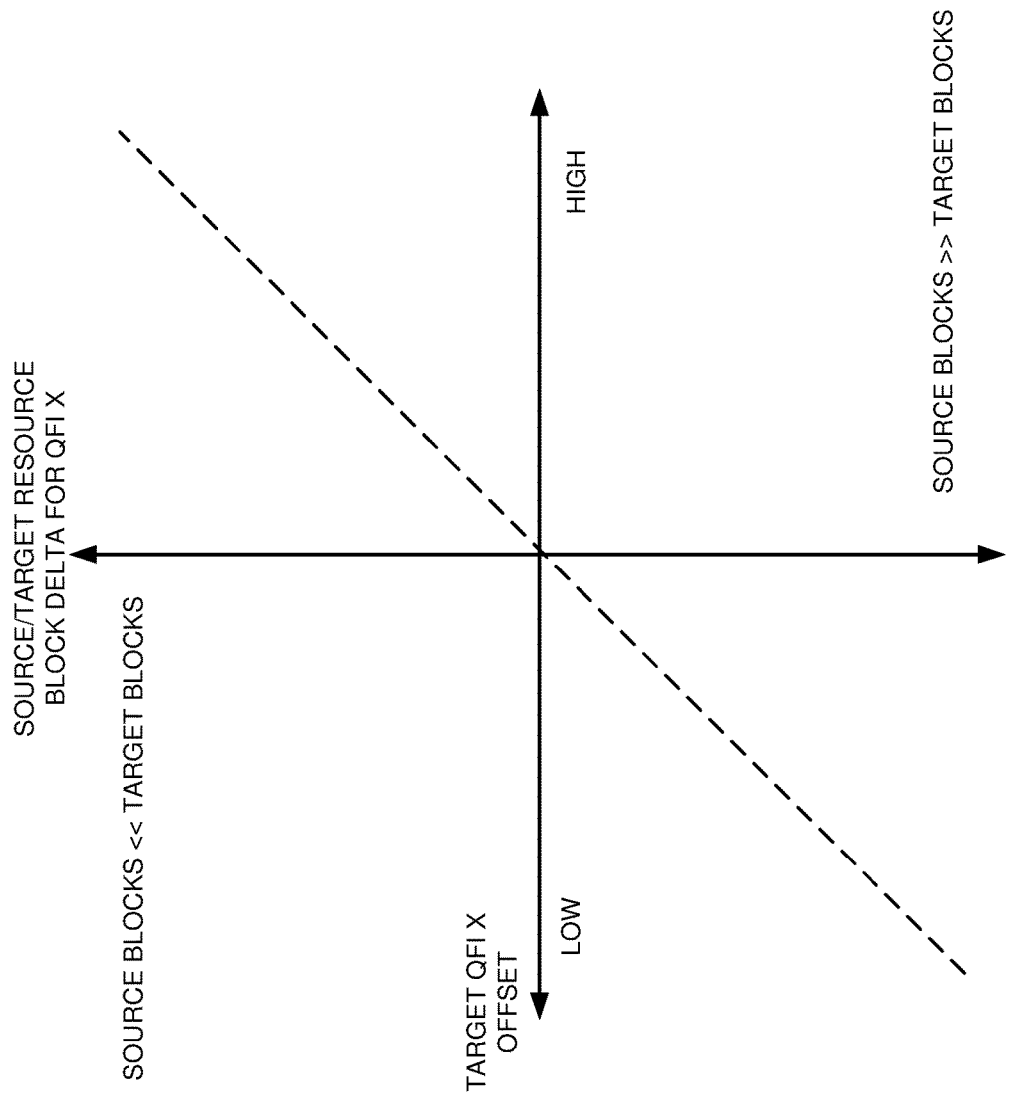
FIG. 11 illustrates the operation of the handover controller to generate the QFI offset based on resource block usage.

FIG. 11 illustrates the operation of the handover controller to generate the QFI offset based on resource block usage. Handover controller 426 hosts a data structure that incorporates the graph of FIG. 11. The horizontal axis of the graph represents a target QFI offset from low on the left to high on the right. A low QFI offset might be one decibel, and a high QFI offset might be five decibels, although other values could be used. The vertical axis represents the delta between resource block usage for the source and target. As indicated by the dashed line, the QFI offset is relatively low when source resource block usage is lower than the target resource block usage. The QFI offset is relatively high when the source resource block usage is higher than the target resource block usage.

Figure 12:
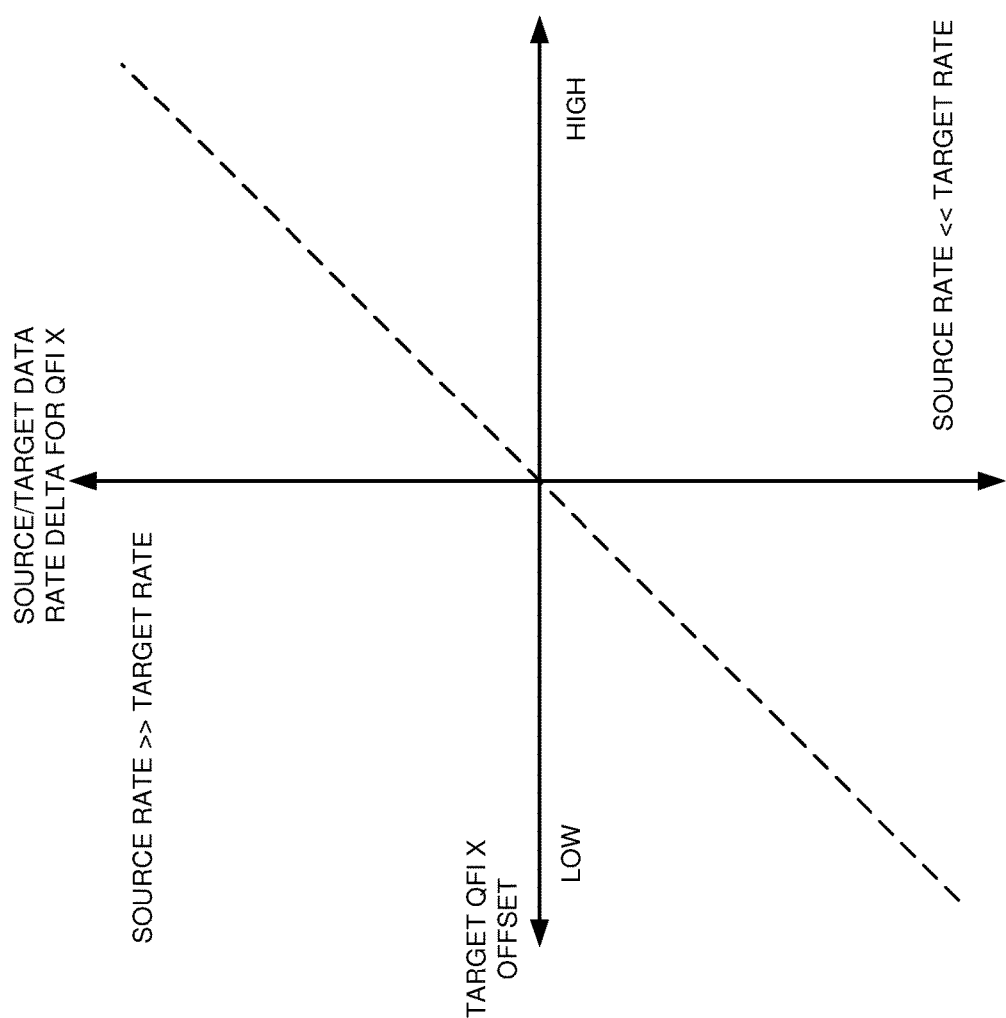
FIG. 12 illustrates the operation of the handover controller to generate the QFI offset based on data rate.

FIG. 12 illustrates the operation of the handover controller to generate the QFI offset based on data rate. Handover controller 426 hosts a data structure that incorporates the graph of FIG. 12. The horizontal axis of the graph represents a target QFI offset from low on the left to high on the right. A low QFI offset might be one decibel, and a high QFI offset might be five decibels, although other values could be used. The vertical axis represents the delta between data rate for the source and target. As indicated by the dashed line, the QFI offset is relatively low when the source data rate is lower than the target data rate. The QFI offset is relatively high when the source data rate is higher than the target data rate.

Figure 13:
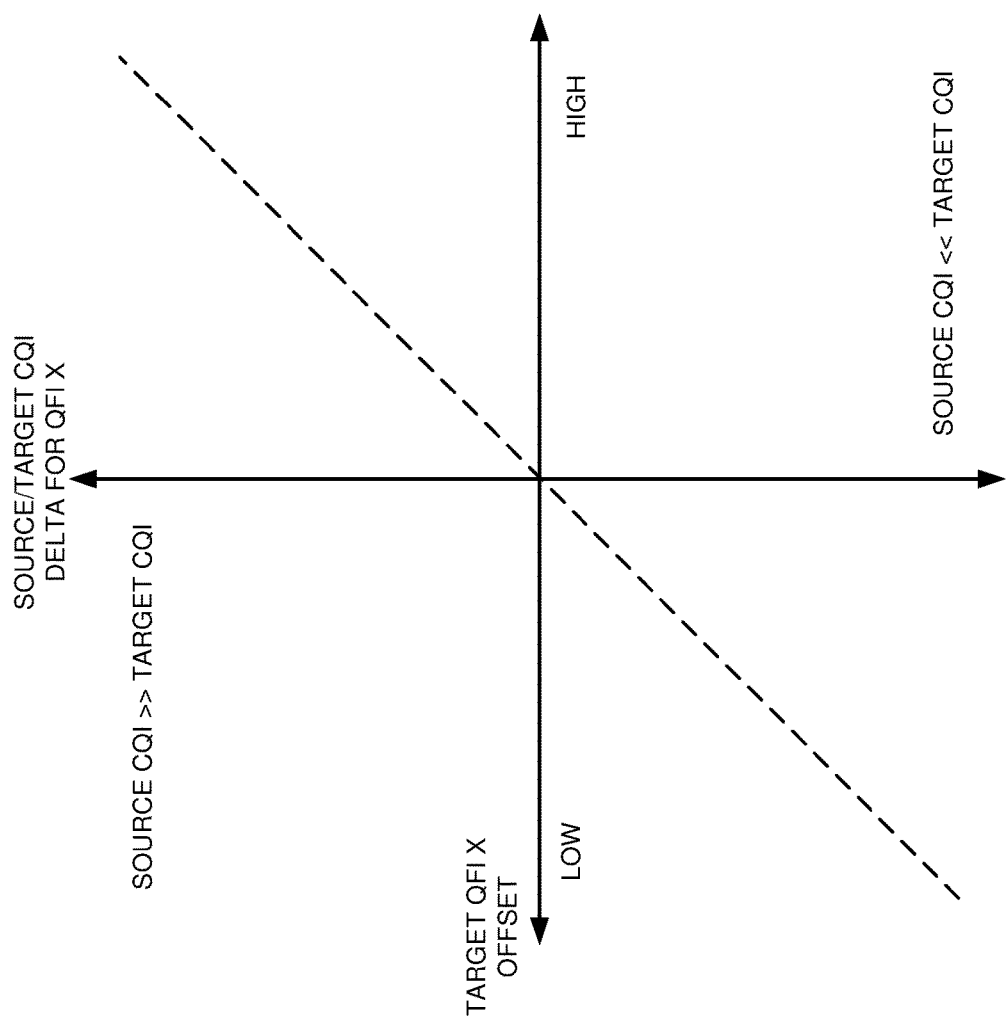
FIG. 13 illustrates the operation of the handover controller to generate the QFI offset based on Channel Quality Index (CQI).

FIG. 13 illustrates the operation of the handover controller to generate the QFI offset based on Channel Quality Index (CQI). Handover controller 426 hosts a data structure that incorporates the graph of FIG. 12. The horizontal axis of the graph represents a target QFI offset from low on the left to high on the right. A low QFI offset might be one decibel, and a high QFI offset might be five decibels, although other values could be used. The vertical axis represents the delta between CQIs for the source and target. As indicated by the dashed line, the QFI offset is relatively low when the source CQI is lower than the target CQI. The QFI offset is relatively high when the source CQI is higher than the target CQI.

The wireless data network circuitry described above comprises computer hardware and software that form special-purpose network circuitry to handover wireless UEs based on QoS. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to handover wireless UEs based on QoS.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to handover a User Equipment (UE), the method comprising:
   a source access node wirelessly delivering a wireless data service, determining a source Quality-of-Service (QOS) for the delivery of the wireless data service from the source access node, and indicating the source QoS to a handover controller;
   the handover controller receiving the source QOS;
   the handover controller receiving a target QoS from a target access node that wirelessly delivers the wireless data service, determines the target QoS for the delivery of the wireless data service from target access node, and indicates the target QoS to the handover controller;
   the handover controller determining a QoS offset based on a QoS difference between the source QoS and the target QoS and indicating the QoS offset to the source access node;
   the source access node receiving the QoS offset for the target access node; and
   the source access node receiving a source signal strength metric for the source access node and a target signal strength metric for the target access node from the UE, and in response, selecting the target access node for the handover based on the QoS offset and a signal strength difference between the source signal strength metric and the target signal strength metric and signaling the UE and the target access node to handover the UE to the target access node.

2. The method of claim 1 wherein the source QoS and the target QoS comprise packet loss QoS.

3. The method of claim 1 wherein the source QoS and the target QoS comprise scheduling delay QoS.

4. The method of claim 1 wherein the source QoS and the target QoS comprise radio resource usage QoS.

5. The method of claim 1 wherein the source QoS and the target QoS comprise data rate QoS.

6. The method of claim 1 wherein the source QoS and the target QoS comprise Channel Quality Index (CQI) QoS.

7. The method of claim 1 wherein:
the source access node wirelessly delivering the wireless data service comprises wirelessly delivering the wireless data service based on a QoS Flow Indicator (QFI); and
the target access node wirelessly delivering the wireless data service comprises wirelessly delivering the wireless data service based on the QFI.

8. The method of claim 1 wherein:
the source access node determining the source QoS and indicating the source QoS to the handover controller comprises determining a source performance metric and indicating the source performance metric to the handover controller;
the handover controller receiving the source QoS comprises receiving the source performance metric;
the handover controller receiving the target QoS comprises receiving a target performance metric from the target access node that determined the target performance metric;
the handover controller determining the QoS offset comprises determining a performance offset based on a performance difference between the source performance metric and the target performance metric;
the handover controller indicating the QoS offset to the source access node comprises indicating the performance offset;
the source access node receiving the QoS offset comprises receiving the performance offset; and
the source access node selecting the target access node for the handover based on the QoS offset and the signal strength difference comprises selecting the target access node for the handover based on the performance offset and the signal strength difference.

9. The method of claim 1 wherein:
the source access node determining the source QoS and indicating the source QoS to the handover controller comprises determining a source QoS Flow Indicator (QFI) and indicating the source QFI to the handover controller;
the handover controller receiving the source QoS comprises receiving the source QFI;
the handover controller receiving the target QoS comprises receiving a target QFI from the target access node;
the handover controller determining the QoS offset comprises determining a QFI offset;
the handover controller indicating the QoS offset to the source access node comprises indicating the QFI offset;
the source access node receiving the QoS offset comprises receiving the QFI offset; and
the source access node selecting the target access node for the handover based on the QoS offset and the signal strength difference comprises selecting the target access node for the handover based on the QFI offset and the signal strength difference.

10. The method of claim 1 wherein the source access node and the target access node comprise Fifth Generation New Radio (5GNR) access nodes.

11. The method of claim 1 wherein the source access node and the target access node comprise Millimeter Wave (MMW) access nodes.

12. A wireless communication network to handover a User Equipment (UE), the wireless communication network comprising:
a source access node configured to wirelessly deliver a wireless data service, determine a source Quality-of-Service (QOS) for the delivery of the wireless data service from the source access node, and indicate the source QoS to a handover controller;
the handover controller configured to receive the source QoS;
the handover controller configured to receive a target QoS from a target access node that wirelessly delivers the wireless data service, determines the target QoS for the delivery of the wireless data service from target access node, and indicates the target QoS to the handover controller;
the handover controller configured to determine a QoS offset based on a QoS difference between the source QoS and the target QoS and indicate the QoS offset to the source access node;
the source access node configured to receive the QoS offset for the target access node; and
the source access node configured to receive a source signal strength metric for the source access node and a target signal strength metric for the target access node from the UE, and in response, select the target access node for the handover based on the QoS offset and a signal strength difference between the source signal strength metric and the target signal strength metric and signal the UE and the target access node to handover the UE to the target access node.

13. The wireless communication network of claim 12 wherein the source QoS and the target QoS comprise packet loss QoS.

14. The wireless communication network of claim 12 wherein the source QoS and the target QoS comprise scheduling delay QoS.

15. The wireless communication network of claim 12 wherein the source QoS and the target QoS comprise radio resource usage QoS.

16. The wireless communication network of claim 12 wherein the source QoS and the target QoS comprise data rate QoS.

17. The wireless communication network of claim 12 wherein the source QoS and the target QoS comprise Channel Quality Index (CQI) QoS.

18. The wireless communication network of claim 12 wherein:
the source access node is configured to wirelessly deliver the wireless data service based on a QoS Flow Indicator (QFI); and
the target access node is configured to wirelessly deliver the wireless data service based on the QFI.

19. The wireless communication network of claim 12 wherein:
the source access node is configured to determine a source performance metric and indicate the source performance metric to the handover controller to determine the source QoS and indicate the source QoS to the handover controller;
the handover controller is configured to receive the source performance metric to receive the source QoS;

the handover controller is configured to receive a target performance metric from the target access node that determined the target performance metric to receive the target QoS;

the handover controller is configured to determine a performance offset based on a performance difference between the source performance metric and the target performance metric to determine the QoS offset;

the handover controller is configured to indicate the performance offset to the source access node to indicate the QoS offset to the source access node;

the source access node is configured to receive the performance offset to receive the QoS offset; and the source access node is configured to select the target access node for the handover based on the performance offset and the signal strength difference to select the target access node for the handover based on the QoS offset and the signal strength difference.

20. The wireless communication network of claim 12 wherein:

the source access node is configured to determine a source QoS Flow Indicator (QFI) and indicate the source QFI to the handover controller to indicate the source QoS to the handover controller;

the handover controller is configured to receive the source QFI to receive the source QoS;

the handover controller is configured to receive a target QFI from the target access node to receive the target QoS;

the handover controller is configured to determine a QFI offset to determine the QoS offset;

the handover controller is configured to indicate the QFI offset to the source access node to indicate the QoS offset to the source access node;

the source access node is configured to receive the QFI offset to receive the QoS offset; and the source access node is configured to select the target access node for the handover based on the QFI offset and the signal strength difference to select the target access node for the handover based on the QoS offset and the signal strength difference.

* * * * *